(12) United States Patent
Kim et al.

(10) Patent No.: US 9,017,878 B2
(45) Date of Patent: Apr. 28, 2015

(54) LITHIUM SECONDARY BATTERY WITH ENHANCED HEAT-RESISTANCE

(75) Inventors: Seok-Koo Kim, Daejeon (KR);
Hyun-Min Jang, Daejeon (KR);
Sang-Young Lee, Daejeon (KR);
Jang-Hyuk Hong, Daejeon (KR)

(73) Assignee: LG Chem, Ltd. (KR)

( * ) Notice: Subject to any disclaimer, the term of this patent is extended or adjusted under 35 U.S.C. 154(b) by 1366 days.

(21) Appl. No.: 12/223,828

(22) PCT Filed: Feb. 16, 2007

(86) PCT No.: PCT/KR2007/000849
§ 371 (c)(1),
(2), (4) Date: Aug. 11, 2008

(87) PCT Pub. No.: WO2007/094642
PCT Pub. Date: Aug. 23, 2007

(65) Prior Publication Data
US 2010/0159314 A1    Jun. 24, 2010

(30) Foreign Application Priority Data
Feb. 16, 2006    (KR) ........................ 10-2006-0015126

(51) Int. Cl.
*H01M 2/16*    (2006.01)
*H01M 10/42*    (2006.01)
(Continued)

(52) U.S. Cl.
CPC ........ *H01M 10/4235* (2013.01); *H01M 2/1653* (2013.01); *H01M 2/1673* (2013.01);
(Continued)

(58) Field of Classification Search
CPC   H01M 2/1653; H01M 2/1673; H01M 2/1686
USPC .......................................... 429/251, 248, 247
See application file for complete search history.

(56) References Cited

U.S. PATENT DOCUMENTS 4,277,547 A * 7/1981 Verzwyvelt ................... 429/251
4,279,978 A 7/1981 Dodin et al.
(Continued)

FOREIGN PATENT DOCUMENTS

CN    1499658 A    5/2004
EP    1416552 A2    5/2004
(Continued)

OTHER PUBLICATIONS

International Search Report, PCT/KR2007/000849, dated May 22, 2007.
(Continued)

*Primary Examiner* — Helen O Conley
(74) *Attorney, Agent, or Firm* — Lerner, David, Littenberg, Krumholz & Mentlik, LLP

(57) ABSTRACT

Disclosed is an electrode whose surface includes an organic/inorganic composite porous coating layer comprising heat-absorbing inorganic particles and a binder polymer, wherein the heat-absorbing inorganic particle is at least one particle selected from the group consisting of antimony-containing compounds, metal hydroxides, guanidine-based compounds, boron-containing compounds and zinc tartrate compounds. A separator using the heat-absorbing inorganic particles as a component for forming or coating the separator, and an electrochemical device including the electrode and/or the separator are also disclosed. The separator using the heat-absorbing inorganic particles as a component for forming or coating the separator can ensure excellent thermal safety and minimizes degradation of the quality of a battery.

13 Claims, 4 Drawing Sheets

(51) Int. Cl.
*H01M 4/13* (2010.01)
*H01M 4/139* (2010.01)
*H01M 10/052* (2010.01)
*H01M 4/02* (2006.01)

(52) U.S. Cl.
CPC .............. *H01M2/1686* (2013.01); *H01M 4/13* (2013.01); *H01M 4/139* (2013.01); *H01M 10/052* (2013.01); H01M 2004/021 (2013.01); Y02E 60/122 (2013.01); Y02T 10/7011 (2013.01)

(56) References Cited

U.S. PATENT DOCUMENTS

| | | | |
|---|---|---|---|
| 5,714,277 A | | 2/1998 | Kawakami |
| 5,728,482 A | * | 3/1998 | Kawakami et al. ............. 429/10 |
| 6,069,313 A | | 5/2000 | Kay |
| 6,201,071 B1 | | 3/2001 | Miura et al. |
| 6,239,208 B1 | | 5/2001 | Halloran et al. |
| 6,296,969 B1 | * | 10/2001 | Yano et al. .................... 429/145 |
| 6,432,586 B1 | | 8/2002 | Zhang |
| 6,436,572 B1 | | 8/2002 | Iyori |
| 6,815,121 B2 | | 11/2004 | Dasgupta et al. |
| 2002/0092155 A1 | * | 7/2002 | Carlson et al. ................. 29/623.5 |
| 2002/0142225 A1 | * | 10/2002 | Kweon et al. ............ 429/231.95 |
| 2003/0072996 A1 | | 4/2003 | Roh |
| 2005/0104554 A1 | | 5/2005 | Tsukamoto et al. |
| 2009/0029262 A1 | * | 1/2009 | Naruse ......................... 429/254 |

FOREIGN PATENT DOCUMENTS

| | | |
|---|---|---|
| JP | S57-17561 A | 1/1982 |
| JP | 62291859 A | 12/1987 |
| JP | 10289733 A | 10/1998 |
| JP | 11-080395 A | 3/1999 |
| JP | 11144706 A | 5/1999 |
| JP | 2002358967 A | 12/2002 |
| JP | 2004288614 A | 10/2004 |
| JP | 2005327663 | 11/2005 |
| KR | 1020010104539 A | 11/2001 |
| KR | 2002-0072770 A | 9/2002 |
| KR | 1020060036588 A | 5/2006 |
| TW | 200441135 | 12/2005 |
| WO | 2005078828 A1 | 8/2005 |
| WO | 2005106990 A2 | 11/2005 |

OTHER PUBLICATIONS

Supplementary European Search Report, EP 07708999, dated Feb. 2, 2010.

Office Action from corresponding Taiwan Patent Application No. 96105717 on Sep. 28, 2010. (claiming priority from Korean Patent Application No. 10-2006-0015126).

Office Action from corresponding Chinese Patent Application No. 200780005967.1 (claiming priority from Korean Patent Application No. 10-2006-0015126) on Aug. 4, 2010.

* cited by examiner (a) Comp. Ex. 1    Ex. 2            (b) Comp. Ex. 1    Ex. 2

LITHIUM SECONDARY BATTERY WITH ENHANCED HEAT-RESISTANCE

CROSS REFERENCE TO RELATED APPLICATIONS

The present application is a national phase entry under 35 U.S.C. §371 of International Application No. PCT/KR2007/000849, filed Feb. 16, 2007, published in English, which claims priority from Korean Patent Application No. 10-2006-0015126, filed Feb. 16, 2006, all of which are incorporated herein by reference.

TECHNICAL FIELD

The present invention relates to an electrode comprising a heat-absorbing porous coating layer that spontaneously absorbs or consumes heat generated inside an electrochemical device, a separator using heat-absorbing inorganic particles as a component for forming or coating the separator, and an electrochemical device using the electrode and/or the separator and having excellent thermal stability.

BACKGROUND ART

Recently, there is increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries has been the focus of attention. More recently, research and development into an electrode and a battery having a novel design have been conducted in order to improve capacity density and specific energy thereof.

Among the currently used secondary batteries, lithium secondary batteries, developed in early 1990's, have drive voltage and energy density higher than those of conventional batteries using aqueous electrolytes (such as Ni-MH batteries, Ni—Cd batteries and $H_2SO_4$—Pb batteries), and thus they are spotlighted in the field of secondary batteries. However, lithium secondary batteries have problems related to the safety, caused by ignition and explosion due to the use of organic electrolytes, and are manufactured through a complicated process.

Evaluation of and security in safety of batteries are very important matters to be considered. Particularly, users should be protected from being injured by malfunctioning of batteries. Therefore, safety of batteries is strictly restricted in terms of ignition and combustion in batteries by safety standards. Many attempts have been made to solve the problem related to the safety of a battery.

More fundamentally, currently available lithium ion batteries and lithium ion polymer batteries use polyolefin-based separators in order to prevent short circuit between a cathode and an anode. However, because such polyolefin-based separators use a polymer component having a melting point of 200° C. or less and are subjected to a stretching step for controlling their pore sizes and porosities so as to be used as separators, they have a disadvantage in that they show high heat shrinking property upon exposure to high temperature. In other words, such separators can be shrunk or molten when the temperature of a battery increases due to internal and/or external factors. Therefore, there is a great possibility of a short-circuit between a cathode and an anode that are in direct contact with each other due to shrinking or melting of separators, resulting in accidents such as ignition and explosion of a battery caused by rapid emission of electric energy. Therefore, it is necessary to develop a separator that causes no heat shrinking at high temperature.

To solve the above problems related with polyolefin-based separators, many attempts are made to develop an electrolyte using an inorganic material capable of substituting for a conventional separator.

U.S. Pat. No. 6,432,586 discloses a polyolefin-based separator coated with an inorganic layer such as calcium carbonate, silica, etc. However, since the composite film still uses a polyolefin-based separator, it cannot provide a significant improvement in the safety of a battery, particularly in terms of the prevention of heat shrinking at high temperature.

Additionally, Creavis Co. (Germany) have developed an organic/inorganic composite separator comprising a non-woven polyester support coated with silica ($SiO_2$) or alumina ($Al_2O_3$). However, in the case of the above separator, the non-woven polyester support cannot provide excellent mechanical and physical properties by nature, and the chemical structure of polyester is liable to electrochemical reactions. Thus, it is thought that the above separator shows many problems in practical use.

Accordingly, there is an imminent need for developing a separator that can improve the quality and safety of an electrochemical device, or a composite electrolyte that also serves as such a separator.

BRIEF DESCRIPTION OF THE DRAWINGS

The foregoing and other objects, features and advantages of the present invention will become more apparent from the following detailed description when taken in conjunction with the accompanying drawings in which.

DISCLOSURE

Technical Problem

Figure 1:
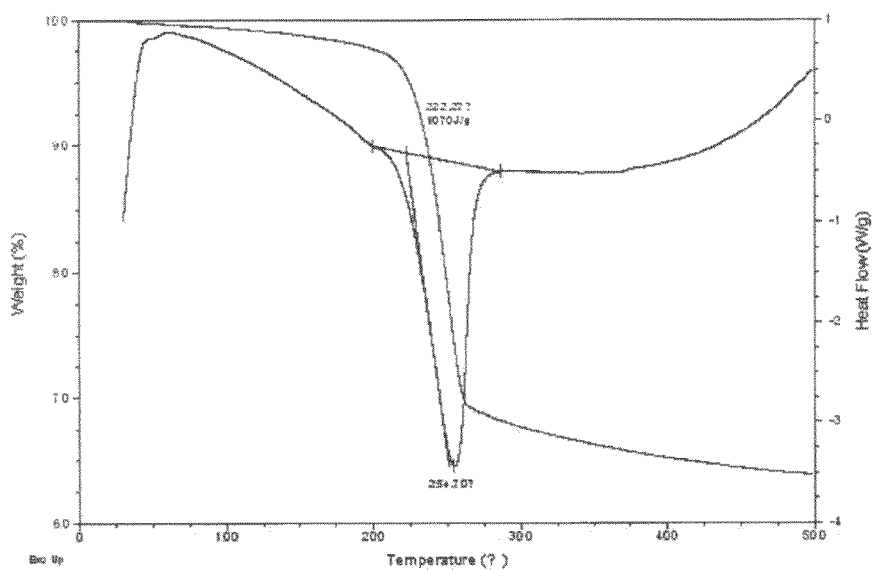
FIG. 1 is a graph showing the endothermic reaction of heat-absorbing particles ($Al(OH)_3$) used according to the present invention.

The inventors of the present invention have found that when conventional inorganic particles are used as a component for forming or coating a separator, it is not possible to fundamentally solve the problem of heat energy generated rapidly upon an internal short circuit between a cathode and an anode caused by external or internal impacts, resulting in dangerous accidents such as ignition or explosion with time or under the application of a secondary impact, even though no heat shrinking occurs even under high temperature conditions in an electrochemical device.

Considering this, according to the present invention, heat-absorbing inorganic particles that absorb or consume heat generated rapidly inside an electrochemical device are used as a component for forming or coating a separator.

Technical Solution

An aspect of the present invention provides an electrode whose surface includes an organic/inorganic composite porous coating layer comprising heat-absorbing inorganic particles and a binder polymer, wherein the heat-absorbing inorganic particle is at least one particle selected from the group consisting of antimony-containing compounds, metal hydroxides, guanidine-based compounds, boron-containing compounds and zinc tartrate compounds. There is also provided an electrochemical device, preferably a lithium secondary battery, comprising the above electrode.

Another aspect of the present invention provides a separator comprising heat-absorbing particles that absorb heat energy generated at a temperature (T) higher than a normal drive temperature of an electrochemical device to be pyrolyzed, or consume such heat energy, as a component for forming or coating the separator. There is also provided an electrochemical device, preferably a lithium secondary battery, comprising the above separator.

Hereinafter, the present invention will be explained in more detail.

The present invention is characterized by using heat-absorbing inorganic particles as a component for forming or coating a separator that serves to prevent a cathode and an anode from being in direct contact with each other and to provide a pathway through which lithium ions pass.

Herein, the separator according to the present invention may be realized to have various forms, including a free-standing separator or a coating layer formed on the surface of a substrate. For example, the separator may be provided as a free-standing separator comprising inorganic particles and a binder polymer, wherein interstitial volumes among the inorganic particles form a pore structure; a separator comprising a porous substrate and an organic/composite porous coating layer formed on the porous substrate, the coating layer including inorganic particles and a binder polymer; or as a monolithic composite electrode functioning not only as an electrode but also as a separator, the electrode including an electrode substrate and an organic/inorganic composite porous coating layer serving as a separator and formed on the electrode substrate. However, the separator according to the present invention is not limited thereto.

The heat-absorbing inorganic particles are those that can absorb or consume heat as soon as it is generated inside an electrochemical device, preferably a battery, and cause spontaneous pyrolysis or produce a new product by using the heat energy absorbed thereby.

The heat-absorbing inorganic particles introduced into the separator inhibit generation of an internal short circuit by preventing a cathode and an anode from being in direct contact with each other. Contrary to conventional non-heat absorbing inorganic particles, the heat-absorbing inorganic particles can inhibit rapid heat emission, even when a thermal runaway phenomenon or internal short circuit occurs due to external or internal factors, and thus can fundamentally prevent ignition and explosion of a battery. Additionally, since the inorganic particles have heat resistance, no heat shrinking occurs at high temperature contrary to a conventional polyolefin-based separator (m.p.: 120~140° C.).

Further, because the heat-absorbing inorganic particles are used as a component not for forming an electrode, in which electrochemical reactions occur, but for forming and/or coating a separator, there is no drop in capacity of a battery caused by the use of such inorganic particles as a material for forming an electrode.

<Heat-Absorbing Inorganic Particles>

There are no particular limitations in composition, shape, content, etc. of the heat-absorbing inorganic particles used as a component for forming and/or coating a separator, as long as the particles can absorb or consume heat generated abnormally inside an electrochemical device.

Preferably, even if the heat-absorbing inorganic particles are pyrolyzed, they are decomposed into at least one material having apparent physical properties (including particle diameter or shape) similar to those of the original heat-absorbing inorganic particles.

Figure 8:
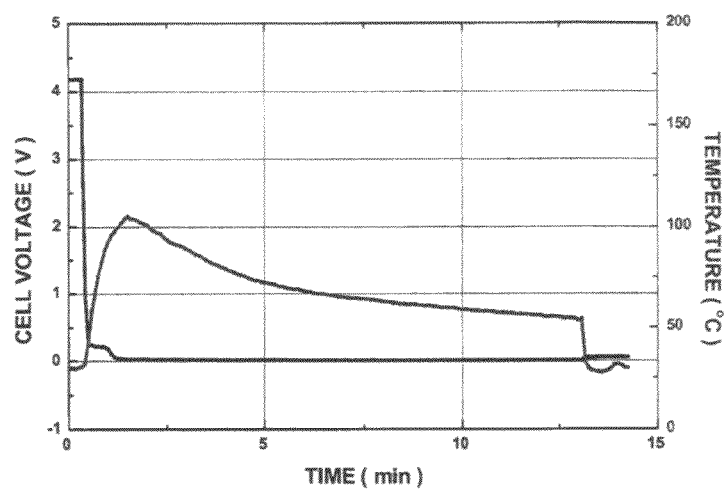
FIG. 8 is a graph showing variations in voltage and temperature of a lithium secondary battery obtained by using an organic/inorganic composite porous separator comprising heat absorbing inorganic particles introduced thereto according to Example 1, after causing an artificial internal short circuit (nail penetration) in the battery.

The heat-absorbing inorganic particles absorb heat energy preferably at a temperature (T) higher than a normal driving temperature of an electrochemical device, wherein the normal driving temperature is at most about 90° C. For example, in the case of an internal short circuit, a rapid local heat emission occurs at a temperature of 400~500° C., resulting in shrinking of a separator. At this time, the separator comprising heat-absorbing inorganic particles introduced thereto inhibits such rapid local heat emission, and thus imparts improved safety to an electrochemical device. In fact, it could be seen from the experimental example performed by the inventors of the present invention that when an internal short circuit occurs in a battery, the separator comprising heat-absorbing particles according to the present invention prevents the battery from being heated to a temperature of 100° C. or higher, and thus ensures excellent thermal safety of the battery (see FIG. 8).

Non-limiting examples of the heat-absorbing inorganic particles include antimony-containing compounds, metal hydroxides, guanidine-based compounds, boron-containing compounds, zinc tartrate compounds, mixtures thereof, or the like.

Non-limiting examples of the antimony-containing compounds include antimony trioxide ($Sb_2O_3$), antimony tetraoxide ($Sb_2O_4$), antimony pentaoxide ($Sb_2O_5$) or a mixture thereof. Non-limiting examples of the metal hydroxides include aluminum hydroxide ($Al(OH)_3$), magnesium hydroxide (Mg(OH)$_2$), or a mixture thereof. Non-limiting examples of the guanidine-based compounds include guanidine nitrate, guanidine sulfaminate, guanidine phosphate, guanyl urea phosphate or a mixture thereof. Non-limiting examples of the boron-containing compounds include H$_3$BO$_3$, HBO$_2$ or a mixture thereof. Non-limiting examples of the zinc tartrate compounds include Zn$_2$SnO$_4$, ZnSnO$_3$ (zinc stannate, ZS), ZnSn(OH)$_6$ (zinc hydroxyl stannate, ZHS) or a mixture thereof.

The above zinc tartrate compounds are pyrolyzed at about 200° C. by an endothermic reaction. When zinc tartrate compounds experience an endothermic reaction, they absorb abnormal heat energy inside a battery, and thus can inhibit a series of exothermic reactions in the battery. Additionally, because the products produced by the zinc tartrate compounds have excellent flame resistance, the zinc tartrate compounds serve to inhibit combustion so that a thermal runaway phenomenon occurring in an electrochemical device cannot proceed to ignition and explosion.

Additionally, aluminum hydroxide, which is a kind of metal hydroxide, is decomposed into Al$_2$O$_3$ and water (H$_2$O) by absorbing heat at a temperature of 200° C. or higher. At this time, aluminum hydroxide absorbs heat energy of about 1000 J/g (see the following Reaction Scheme 1 and FIG. 1). Further, magnesium hydroxide also shows heat-absorbing property with heat energy absorption of about 1300 J/g (see the following Reaction Scheme 2). Therefore, when heat energy accumulated in the inorganic particles corresponds to the above-mentioned heat energy values or when heat emission occurs to a level corresponding to the above-mentioned heat energy values, endothermic reactions occur immediately so as to improve the safety of an electrochemical device.

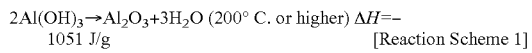
2Al(OH)$_3$→Al$_2$O$_3$+3H$_2$O (200° C. or higher) ΔH=− 1051 J/g [Reaction Scheme 1]

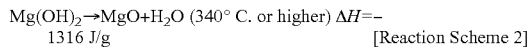
Mg(OH)$_2$→MgO+H$_2$O (340° C. or higher) ΔH=− 1316 J/g [Reaction Scheme 2]

In addition, as shown in the following Reaction Schemes 3 and 4, boron compounds are pyrolyzed at a temperature of 130° C. or higher and swelled in H$_2$O, so that they exist as molten compounds having flame resistance.

2H$_3$BO$_3$→2HBO$_2$+2H$_2$O (130~200° C.) [Reaction Scheme 3]

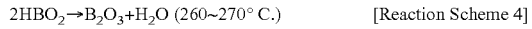
2HBO$_2$→B$_2$O$_3$+H$_2$O (260~270° C.) [Reaction Scheme 4]

Also, antimony-containing compounds are pyrolyzed and absorb the heat generated inside an electrochemical device, thereby improving the safety of an electrochemical device.

Besides the above-mentioned inorganic particles, other compounds that absorb the heat generated in an electrochemical device to be pyrolyzed or to produce new compounds are also included in the scope of the present invention. Additionally, inorganic flame resistant materials or organic flame resistant materials known to those skilled in the art may be used in combination with the heat-absorbing inorganic particles. Particularly, a combination of the heat-absorbing inorganic particles with an organic flame resistant material, such as a halide, further improves the safety of an electrochemical device.

The heat-absorbing inorganic particles according to the present invention can serve not only to form pores by the interstitial volumes among the interconnected inorganic particles but also to maintain the physical shape of a separator as a kind of spacer.

According to the present invention, inorganic particles having a high dielectric constant and/or low density may be used optionally together with the heat-absorbing inorganic particles. When the inorganic particles have a high dielectric constant, they can increase the dissociation degree of lithium ions in a liquid electrolyte. Preferably, the inorganic particles have a dielectric constant of 5 or more. Non-limiting examples of such inorganic particles having a dielectric constant of 5 or more include SrTiO$_3$, SnO$_2$, CeO$_2$, MgO, NiO, ZnO, Y$_2$O$_3$, ZrO$_2$, Al$_2$O$_3$, TiO$_2$, BaTiO$_3$ or a mixture thereof.

Although there is no particular limitation in the size of the heat-absorbing inorganic particles, the inorganic particles preferably have a size of 0.001~10 μm in order to form a separator having a uniform thickness and to provide an adequate porosity. If the size is less than 0.001 μm, the inorganic particles have poor dispersibility so that the structure and physical properties of the organic/inorganic composite porous separator cannot be controlled with ease. If the size is greater than 10 μm, the resultant organic/inorganic composite porous separator has an increased thickness under the same solid content, resulting in degradation in mechanical properties. Furthermore, such excessively large pores may increase a possibility of an internal short circuit being generated during repeated charge/discharge cycles.

<Binder Polymer>

One component for forming or coating the separator according to the present invention is a binder polymer currently used in the art.

The binder polymers preferably have a glass transition temperature (T$_g$) as low as possible, more preferably T$_g$ of between −200° C. and 200° C., because they can improve mechanical properties such as flexibility and elasticity of a final coating layer.

When the binder polymer has ion conductivity, it can further improve the performance of an electrochemical device. Therefore, the binder polymer preferably has a dielectric constant as high as possible. In practice, because the dissociation degree of a salt in an electrolyte depends on the dielectric constant of a solvent used in the electrolyte, the polymer having a higher dielectric constant can increase the dissociation degree of a salt in the electrolyte used in the present invention. The dielectric constant of the polymer may range from 1.0 to 100 (as measured at a frequency of 1 kHz), and is preferably 10 or more.

Further, when using a binder polymer having a high degree of swelling with an electrolyte, the electrolyte can infiltrate into the polymer, and thus the binder polymer can impart electrolyte ion conductivity to the organic/inorganic composite porous separator or can improve the electrolyte ion conductivity. More particularly, the surface of the inorganic particles used according to the prior art serves as a resistance layer interrupting lithium ion movements. However, when a binder polymer has a high degree of swelling with an electrolyte on the surface of the porous inorganic particles and/or in the pores formed on the interstitial volumes among the inorganic particles, interfacial resistance occurring between the inorganic particles and the electrolyte decreases so that solvated lithium ions can be drawn and moved toward the inside of the pores. Such improved lithium ion conduction can activate electrochemical reactions in a battery and can improve the quality of a battery. In addition to the above, when the binder polymer is a polymer that can be gelled when swelled with an electrolyte, the polymer can react with an electrolyte injected subsequently into a battery, and thus can be gelled to form a gel type organic/inorganic composite electrolyte. Therefore, it is preferable to use a polymer having a solubility parameter of between 15 and 45 MPa$^{1/2}$, more preferably of between 15 and 25 MPa$^{1/2}$, and between 30 and 45 MPa$^{1/2}$. If the binder polymer has a solubility parameter of less than 15 Mpa$^{1/2}$ or greater than 45 Mpa$^{1/2}$, it is difficult for the binder polymer to be swelled with a conventional liquid electrolyte for a battery.

Non-limiting examples of the binder polymer that may be used in the present invention include polyvinylidene fluoride-co-hexafluoropropylene, polyvinylidene fluoride-co-trichloroethylene, polymethylmethacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer, polyimide, polyacarylonitrile-co-styrene, gelatine, polyethylene glycol, polyethylene glycol dimethyl ether, glyme, polyvinylidene fluoride or mixtures thereof. Other materials may be used alone or in combination, as long as they satisfy the above characteristics.

<Organic/Inorganic Composite Porous Separator>

The organic/inorganic composite porous separator comprising heat-absorbing particles according to the present invention may be present as a free-standing separator, or as a coating layer formed on a substrate and capable of functioning as a separator.

The organic/inorganic composite porous separator may have any one of the following three types of structures, but is not limited thereto.

① In the first embodiment, the organic/inorganic composite porous separator may form a free-standing type organic/inorganic composite porous separator merely by using a mixture of heat-absorbing inorganic particles and a binder polymer.

In the free-standing organic/inorganic composite porous separator, interstitial volumes among the heat-absorbing inorganic particles that serve not only as a support but also as a spacer for a pore structure having a uniform pore size and porosity. More preferably, the free-standing organic/inorganic composite porous separator includes heat-absorbing particles and a binder polymer coating layer partially or totally formed on the surface of the inorganic particles, wherein the inorganic particles are interconnected among themselves and are fixed by the binder polymer, and the interstitial volumes among the heat-absorbing inorganic particles form a pore structure.

Figure 4:
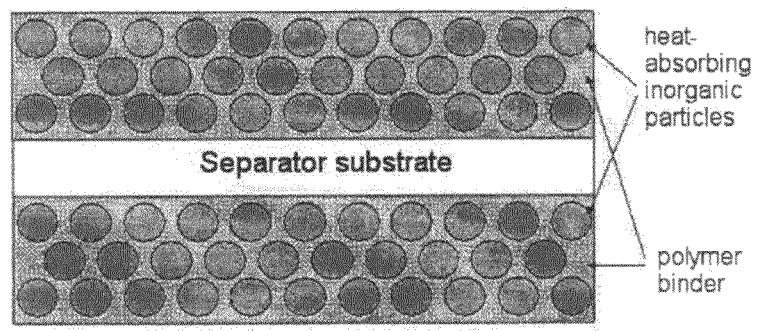
FIG. 4 is a schematic view of the section of an organic/inorganic composite porous separator according to the present invention.

② In the second embodiment, the organic/inorganic composite porous separator may be provided by coating a porous separator substrate having pores with the above mixture so as to form an organic/inorganic composite porous coating layer capable of functioning as a separator on the surface of the porous substrate and/or in the pores of the substrate (see FIG. 4).

In the organic/inorganic composite porous separator according to the present invention, there is no particular limitation in the substrate as long as the substrate is a porous separator substrate having pores. For example, the porous separator substrate may include a polyolefin-based separator currently used in the art or a heat resistant porous substrate having a melting point of 200° C. or higher. Particularly, when using a heat resistant porous substrate, it is possible to prevent a separator from shrinking by external and/or internal heat application, and thus to ensure the thermal safety of the organic/inorganic composite porous separator.

Non-limiting examples of the porous separator substrate that may be used in the present invention include high density polyethylene, low density polyethylene, linear low density polyethylene, ultrahigh molecular weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylenesulfide, polyethylene naphthalene or combinations thereof. Also, other heat resistant engineering plastics may be used with no particular limitation.

Although there is no particular limitation in the thickness of the porous separator substrate, the substrate preferably has a thickness between 1 µm and 100 µm, more preferably between 5 µm and 50 µm. If the substrate has a thickness less than 1 µm, it is difficult to maintain mechanical properties. If the substrate has a thickness greater than 100 µm, it may function as a resistance layer.

Although there is no particular limitation in the pore size and porosity of the porous separator substrate, the substrate preferably has a porosity of between 5% and 95%. The pore size (diameter) preferably ranges from 0.01 µm to 50 µm, more preferably from 0.1 µm to 20 µm. When the pore size and porosity are less than 0.01 µm and 5%, respectively, the substrate may function as a resistance layer. When the pore size and porosity are greater than 50 µm and 95%, respectively, it is difficult to maintain mechanical properties.

Therefore, the organic/inorganic composite porous separator according to the present invention comprises a porous substrate having pores and an organic/inorganic composite porous coating layer formed on the surface or in the pores of the substrate by using a mixture of heat-absorbing inorganic particles and a binder polymer, wherein the heat-absorbing inorganic particles are interconnected among themselves and fixed by the binder polymer, and the interstitial volumes among the heat-absorbing inorganic particles form a pore structure.

③ In the third embodiment, the above mixture is coated onto a preliminarily formed cathode and/or anode to form an organic/inorganic composite porous separator directly on an electrode. In this case, the organic/inorganic composite porous separator is formed integrally with an electrode capable of reversible lithium intercalation/deintercalation.

The composite electrode comprising the organic/inorganic composite porous separator thereon according to the present invention is obtained by coating a mixture of heat-absorbing inorganic particles and a binder polymer onto the surface of an electrode comprising a collector and electrode active material particles bound to the collector while forming a pore structure, wherein the heat-absorbing inorganic particles are interconnected among themselves and fixed by the binder polymer, and the interstitial volumes among the heat-absorbing inorganic particles form a pore structure.

Since the electrode comprising the organic/inorganic composite porous separator according to the present invention is formed by coating the separator directly onto the surface of an electrode substrate including electrode active material particles bound to a collector while forming a pore structure, the electrode active material layer and the organic/inorganic composite porous separator can be anchored to each other and firmly bound to each other physically and organically. Therefore, problems related to mechanical properties such as brittleness can be improved by virtue of an excellent interfacial adhesion between the electrode substrate and the organic/inorganic composite porous coating layer.

The organic/inorganic composite porous separator that can be realized in various forms as described above is characterized by comprising a pore structure having a uniform pore size and porosity.

Figure 2:
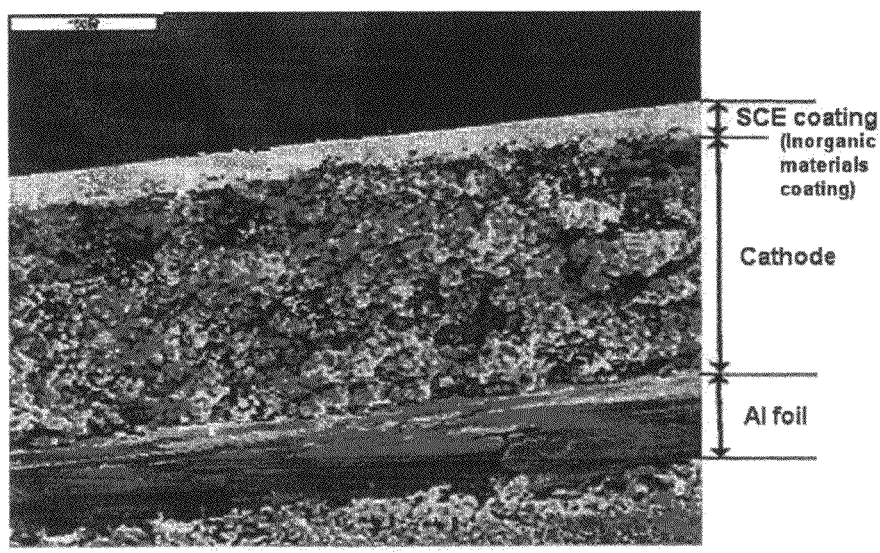
FIG. 2 is a photographic view of the section of an electrode comprising a heat-absorbing organic/inorganic composite porous coating layer according to the present invention, taken by SEM (scanning electron microscopy), the electrode including a collector (Al foil), an electrode active material layer formed on the collector and a heat-absorbing organic/inorganic composite porous coating layer formed on the electrode active material layer, stacked successively.

First of all, in the free-standing organic/inorganic composite porous separator, interstitial volumes among the inorganic particles functioning not only as a support but also as a spacer form a pore structure. Additionally, the organic/inorganic composite porous separator formed by coating the above mixture onto a porous substrate has pore structures not only in the porous substrate itself, but also in the coating layer due to the interstitial volumes among the inorganic particles formed on the substrate. Further, the composite electrode formed by coating an electrode substrate with the above mixture includes a pore structure having a uniform pore size and porosity due to the interstitial volumes among the heat-absorbing particles in addition to the pore structure formed by electrode active material particles in the electrode. Therefore, it is possible to significantly reduce interfacial resistance upon the injection of an electrolyte, to increase the space to be impregnated with an electrolyte by virtue of the pore structure having a uniform size, and to facilitate lithium ion conduction. As a result, the pore structure unique to the organic/inorganic composite porous separator according to the present invention can minimize degradation of the quality of a battery (see FIGS. 2 and 3 and Table 1).

In the organic/inorganic composite porous separators according to the above preferred embodiments of the present invention, the heat-absorbing inorganic particles are present preferably in a ratio of 10~99:1~90 (heat-absorbing particles: binder polymer, on the weight basis), more preferably in a ratio of 50~95:5~50. If the content of the heat-absorbing inorganic particles is excessively low, the binder polymer is present in such a large amount that the interstitial volumes formed among the inorganic particles are decreased, and thus the pore size and porosity are reduced, resulting in degradation in the quality of a finished battery. If the content of the heat-absorbing inorganic particles is excessively high, the polymer content is too low to provide sufficient adhesion among the inorganic particles, resulting in degradation in mechanical properties of a finally formed organic/inorganic composite porous coating layer.

There is no particular limitation in the thickness of the organic/inorganic composite porous separator. Also, when the organic/inorganic composite porous separator is formed integrally on the surface of an electrode, it is possible to independently control the thickness of each separator on a cathode and on an anode. According to the present invention, it is preferable to control the thickness of the separator in a range of 1~100 μm, more preferably of 1~30 μm, in order to reduce the internal resistance of a battery.

Additionally, the organic/inorganic composite porous separator preferably has a pore size of 0.001~10 μm and a porosity of 5~95%, but is not limited thereto.

The organic/inorganic composite porous separator according to the present invention may be obtained by using a conventional method known to those skilled in the art. In a preferred embodiment of the method, the heat-absorbing inorganic particles are added to and mixed with a polymer solution in which a binder is dissolved, and then the mixture is coated and dried on a substrate.

Herein, when a porous substrate having pores and a preliminarily formed electrode are used as the substrates, the organic/inorganic composite porous separators according to the second embodiment and the third embodiment can be provided, respectively. Also, when the mixture is coated on a substrate and then the substrate is removed, the above free-standing type organic/inorganic composite porous separator can be provided.

Also, as the solvent for dissolving the binder polymer, it is possible to use any solvent known to those skilled in the art with no particular limitation. A solvent having a solubility parameter similar to the solubility parameter of the binder polymer and a low boiling point is preferred.

It is preferable to perform a step of pulverizing inorganic particles after adding the heat-absorbing inorganic particles to the preformed binder polymer solution. Conventional pulverization methods, preferably a method using a ball mill, may be used.

According to the present invention, in order to control the pore size, porosity and thickness of an organic/inorganic composite porous coating layer to be formed finally, various factors for controlling pores of the coating layer, including pore size, porosity, dimension (particle diameter) and content of the porous inorganic particles and composition of the porous inorganic particles and the binder polymer, may be adjusted as necessary.

For example, as the weight ratio (I/P) of the heat-absorbing inorganic particles (I) to the polymer (P) increases, pore forming capability of the organic/inorganic composite porous coating layer increases due to an increase in interstitial volumes among the inorganic particles. Therefore, pore size and porosity increase in the finally formed organic/inorganic composite porous coating layer. On the other hand, the thickness of the organic/inorganic composite porous separator increases under the same solid content (weight of the inorganic particles+weight of the binder polymer). Additionally, as the size (particle diameter) of the inorganic particles increases, interstitial distance among the inorganic particles increases, thereby increasing the pore size.

The mixture of the heat-absorbing inorganic particles with the binder polymer obtained as described above is coated on a substrate by using any method known to one skilled in the art, including dip coating, die coating, roll coating, comma coating or combinations thereof. Then, the coating layer is dried to provide the organic/inorganic composite porous separator according to the present invention.

The organic/inorganic composite porous separator obtained as described above according to the present invention may be used as a separator for an electrochemical device, preferably a lithium secondary battery. In the organic/inorganic composite porous separator, the heat-absorbing inorganic particles included therein or coated thereon can inhibit the separator from shrinking or melting at high temperature.

<Electrochemical Device>

Further, the present invention provides an electrochemical device comprising a cathode, an anode and an electrolyte, the electrochemical device comprising an electrode having the organic/inorganic composite porous separator, a separator comprising heat-absorbing inorganic particles introduced thereto, or both.

Such electrochemical devices include any devices in which electrochemical reactions occur, and particular examples thereof include all kinds of primary batteries, secondary batteries, fuel cells, solar cells or capacitors. Particularly, the electrochemical device is a lithium secondary battery including a lithium metal secondary battery, lithium ion secondary battery, lithium polymer secondary battery or lithium ion polymer secondary battery.

The electrochemical device may be manufactured by a conventional method known to one skilled in the art. In one embodiment of the method for manufacturing the electrochemical device, an electrode assembly having a cathode and an anode is formed and an electrolyte is injected into the electrode assembly. Herein, the above-described organic/inorganic composite porous separator may be interposed between both electrodes to provide the electrochemical device. Also, when using a monolithic composite electrode capable of functioning also as a separator by virtue of the organic/inorganic composite porous separator and, the electrochemical device is assembled by using a cathode and an anode. Therefore it is possible to simplify the process for manufacturing an electrochemical device.

There are no particular limitations in the cathode, anode and electrolyte that may be applied in combination with the organic/inorganic composite porous separator according to the present invention. Any cathodes, anodes and electrolytes generally used in conventional electrochemical devices may be used.

Also, the electrochemical device according to the present invention may further comprise a microporous separator, such as a polyolefin-based separator, in addition to the organic/inorganic composite porous separator according to the present invention.

BEST MODE FOR CARRYING OUT THE INVENTION

Reference will now be made in detail to the preferred embodiments of the present invention. It is to be understood that the following examples are illustrative only and the present invention is not limited thereto.

Example 1

Manufacture of Anode

To N-methyl-2-pyrrolidone (NMP) as a solvent, 96 wt % of carbon powder as an anode active material, 3 wt % of polyvinylidene fluoride (PVDF) as a binder and 1 wt % of carbon black as a conductive agent were added to form mixed slurry for an anode. The slurry was coated on Cu foil having a thickness of about 10 μm as an anode collector, and then dried to form an anode. Then, the anode was subjected to roll press.

(Manufacture of Cathode)

To N-methyl-2-pyrrolidone (NMP) as a solvent, 92 wt % of lithium cobalt composite oxide ($LiCoO_2$) as a cathode active material, 4 wt % of carbon black as a conductive agent and 4 wt % of PVDF as a binder were added to form slurry for a cathode. The slurry was coated on Al foil having a thickness of about 20 μm as a cathode collector, and then dried to form a cathode. Then, the cathode was subjected to roll press.

(Electrode Surface Coating)

Figure 3:
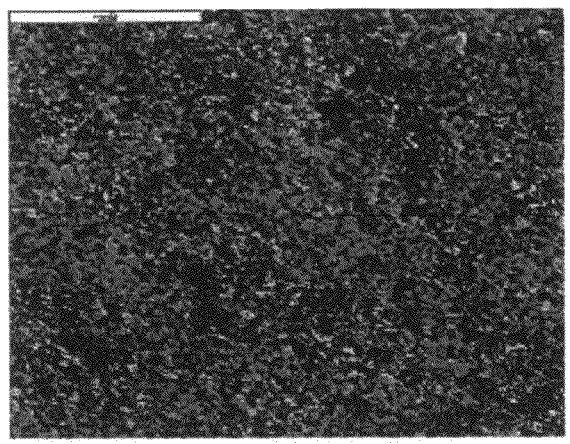
FIG. 3 is a photographic view of the surface of a heat-absorbing organic/inorganic composite porous coating layer formed on the surface of a preliminarily formed electrode, taken by SEM.

About 5 wt % of PVdF-CTFE polymer (polyvinylidene fluoride-chlorotrifluoroethylene copolymer) having a solubility parameter of 20~25 $MPa^{1/2}$ or PVdF-HFP (polyvinylidene fluoride-hexyluoropropylene) polymer having a solubility parameter of 22~30 $MPa^{1/2}$ was added to acetone and dissolved therein at 50° C. for about 12 hours or more to provide a polymer solution. To the preformed polymer solution, aluminum hydroxide ($Al(OH)_3$) powder was added in an amount of 20 wt % on the solid content basis, and the aluminum hydroxide powder was pulverized and dispersed by using a ball mill for 12 hours or more to provide slurry. In the slurry, particle diameter of the aluminum hydroxide particles may be controlled according to the size (particle size) of the beads and the ball milling time. In this example, the aluminum hydroxide particles are pulverized into a size of about 800 nm to provide slurry. Then, the slurry was coated onto surfaces of the preliminarily formed cathode and anode to a thickness of about 15 μm via a dip coating process. After calculating average pore size and porosity of the resultant organic/inorganic composite porous coating layer from the SEM photograph as shown in FIG. 3, the coating layer has an average pore size and porosity of 0.3 μm and 45%, respectively.

The anode and the cathode obtained as described above were stacked to provide an electrode assembly using no conventional polyolefin-based separator. Then, an electrolyte comprising 1M lithium hexafluorophosphate ($LiPF_6$) in ethylene carbonate (EC), propylene carbonate (PC) and diethyl carbonate (DEC) in a weight ratio of 30/20/50 (EC/PC/DEC) was injected thereto to provide a lithium secondary battery.

Example 2

Example 1 was repeated to provide an organic/inorganic composite porous separator and a battery including the same, except that a mixture of the polymer and aluminum hydroxide ($Al(OH)_3$) powder was coated onto a polyethylene separator having a thickness of about 18 μm (porosity 45%) instead of the preliminarily formed electrode.

After measuring the average pore size and porosity by using a porosimeter, the organic/inorganic composite porous separator had an average pore size of 0.4 μm and a porosity of 55%. FIG. 4 shows the structure of the organic/inorganic composite porous separator.

Example 3

Example 1 was repeated to provide an organic/inorganic composite porous separator and a battery including the same, except that a mixture of the polymer and aluminum hydroxide ($Al(OH)_3$) powder was coated onto a teflon sheet substrate instead of the preliminarily formed electrode, the solvent was dried, and then the teflon sheet was removed.

Comparative Example 1

Example 1 was repeated to provide a lithium secondary battery, except that a conventional polyethylene (PE) separator known to those skilled in the art was used.

Comparative Example 2

Example 1 was repeated to provide an electrode and a lithium secondary battery including the same electrode, except that alumina ($Al_2O_3$) particles as non-heat absorbing inorganic particles were used instead of aluminum hydroxide ($Al(OH)_3$) particles.

Experimental Example 1

Surface Analysis of Organic/Inorganic Composite Porous Separator

The following test was performed to analyze the surface of the organic/inorganic composite porous separator according to the present invention.

The sample used in this test was the organic/inorganic composite porous separators comprising heat-absorbing inorganic particles ($Al(OH)_3$) according to Examples 1 and 2.

Figure 5:
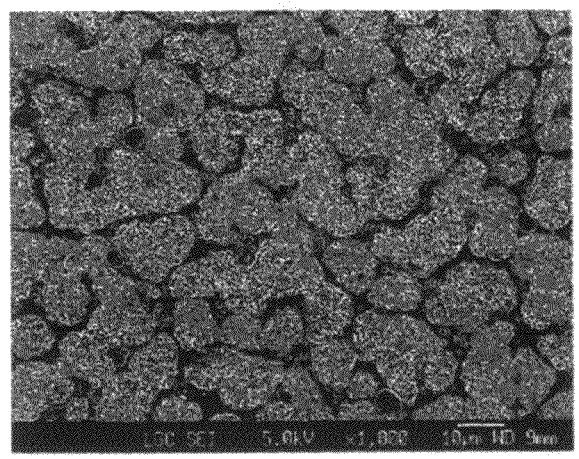
FIG. 5 is a photographic view showing the surface of a porous separator comprising heat-absorbing inorganic particles introduced as a component forming the coating layer, taken by SEM.

When analyzed by using a Scanning Electron Microscope (SEM), the organic/inorganic composite porous separator according to Example 1 showed uniform pore structures formed in the electrode substrate itself (see FIG. 2) as well as in the organic/inorganic composite porous coating layer using the heat-absorbing inorganic particles (see FIG. 3). Similarly, the organic/inorganic composite porous separator according to Example 2 showed a uniform pore structure formed in the organic/inorganic composite porous coating layer using the heat-absorbing inorganic particles (see FIG. 5).

Experimental Example 2

Evaluation for Safety of Lithium Secondary Battery

The following test was performed to evaluate the safety of a lithium secondary battery comprising the organic/inorganic composite porous separator according to the present invention.

2-1. Nail Penetration Test

The lithium secondary battery including the organic/inorganic composite porous separator comprising heat-absorbing inorganic particles according to Example 1 was used as a sample. As controls, the lithium secondary batteries using the polyolefin-based separator according to Comparative Example 1 and the organic/inorganic composite porous separator comprising conventional non-heat absorbing inorganic particles according to Comparative Example 2 were used. The batteries were subjected to the following nail penetration test.

The nail penetration test is a test for observing whether a battery causes ignition and explosion or not, after an artificial internal short circuit is generated by causing a sharp needle-like object to penetrate into the battery at a constant speed so that a cathode and an anode are in direct contact with each other.

Figure 6:
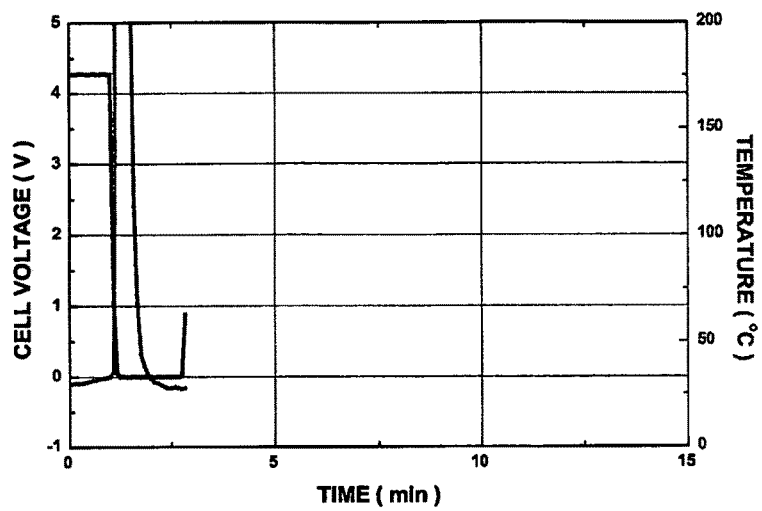
FIG. 6 is a graph showing variations in voltage and temperature of a lithium secondary battery obtained by using the polyolefin-based separator according to Comparative Example 1, after causing an artificial internal short circuit (nail penetration) in the battery.
Figure 7:
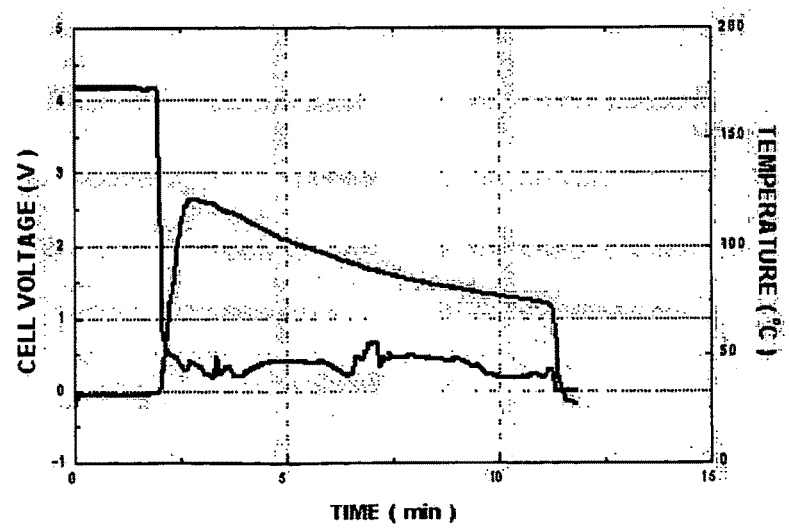
FIG. 7 is a graph showing variations in voltage and temperature of a lithium secondary battery obtained by using a composite separator comprising non-heat absorbing inorganic particles introduced thereto according to Comparative Example 2, after causing an artificial internal short circuit (nail penetration) in the battery.

After the test, the battery using the polyolefin-based separator according to Comparative Example 1 showed a rapid drop in voltage to 0 due to the generation of an internal short circuit in the battery and ignited due to an increase in internal temperature of the battery (see FIG. 6). Additionally, the battery using the organic/inorganic composite porous separator comprising non-heat absorbing inorganic particles according to Comparative Example 2 did not ignite, but showed an increase in surface temperature to 125° C. (see FIG. 7). Such an excessive increase in temperature of a battery significantly increases a possibility of ignition or explosion with time.

On the contrary, the battery using the organic/inorganic composite porous separator comprising heat absorbing inorganic particles according to Example 1 did not ignite and showed an increase in surface temperature merely to 100° C. This indicates that use of the heat-absorbing inorganic particles ensures the safety of a battery (see FIG. 8).

2-2. Hot Box Test

Each battery was stored at a high temperature of 150° C. for 1 hour. Then, the condition of each battery was observed.

Figure 9:
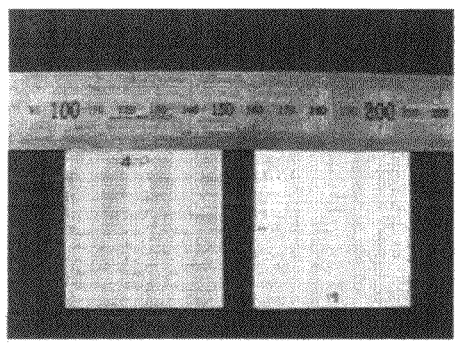
FIG. 9 is a photographic view showing the organic/inorganic composite porous separator and a currently used polyolefin-based separator after storing them at room temperature (a) and 150° C. for 1 hour (b), respectively.
Figure 9:
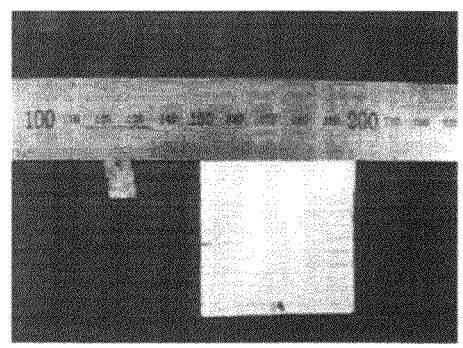

After the test, the battery using a conventional polyolefin-based separator according to Comparative Example 1 showed severe heat shrinking and molten and broken after storing it at a temperature of 150° C. for 1 hour. Contrary to this, the organic/inorganic composite porous separator comprising heat-absorbing inorganic particles according to Example 2 experienced no change even after storing it at a high temperature of 150° C., and showed excellent thermal stability (see FIG. 9).

Experimental Example 3

Evaluation for Quality of Lithium Secondary Battery

The following test was performed in order to evaluate C-rate characteristics of the lithium secondary battery comprising the organic/inorganic composite porous separator according to the present invention.

The lithium secondary battery using the organic/inorganic composite porous separator comprising heat-absorbing particles according to Example 1, the lithium secondary battery using the polyolefin-based separator according to Comparative Example 1 and the lithium secondary battery using the organic/inorganic composite porous separator according to Comparative Example 2 were used in this test. Each battery having a capacity of 2.4 Ah was subjected to cycling at a discharge rate of 0.2 C, 0.5 C, 1 C, 1.5 C and 2 C. The following Table 1 shows the discharge capacity of each battery, the capacity being expressed on the basis of C-rate characteristics.

After the test, it can be seen that the lithium secondary battery using the organic/inorganic composite porous separator comprising heat-absorbing inorganic particles according to Example 1 is comparable to the battery using the conventional polyolefin-based separator in terms of C-rate characteristics under a discharge rate up to 2 C (see Table 1).

TABLE 1

|  | Capacity | 0.2 C | 0.5 C | 1.0 C | 1.5 C | 2.0 C |
| --- | --- | --- | --- | --- | --- | --- |
| Comp. Ex. 1 | mAh | 2408 | 2377 | 2320 | 2293 | 2240 |
|  | % | 100.0% | 98.7% | 96.3% | 95.2% | 93.0% |
| Comp. Ex. 2 | mAh | 2406 | 2373 | 2316 | 2279 | 2224 |
|  | % | 100.0% | 98.6% | 96.3% | 94.7% | 92.5% |
| Ex. 1 | mAh | 2410 | 2372 | 2325 | 2295 | 2243 |
|  | % | 100.0% | 98.4% | 96.5% | 95.2% | 93.1% |

INDUSTRIAL APPLICABILITY

As can be seen from the foregoing, the organic/inorganic composite porous separator, using heat-absorbing inorganic particles that absorb or consume heat energy generated in an electrochemical device as a component for forming or coating the separator, consumes heat energy generated upon rapid heating caused by external or internal factors, and thus can ensure excellent thermal safety of the electrochemical device.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A separator comprising a mixture of a binder polymer having a glass transition temperature ($T_g$) of between −200° C. and 200° C., a solubility parameter of 15-45 MPa$^{1/2}$, and a dielectric constant of 10 or more as measured at a frequency of 1 kHz, and heat-absorbing inorganic particles which absorb heat energy generated at a temperature (T) higher than a normal drive temperature of an electrochemical device so that they are pyrolyzed, or consume the heat energy, wherein the binder polymer is selected from the group consisting of polyvinylidene fluoride-co-hexafluoropropylene, polyvinylidene fluoride-co-trichloroethylene, polymethylmethacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer, polyimide, polyacarylonitrile-co-styrene, gelatine, polyethylene glycol, polyethylene glycol dimethyl ether, glyme, polyvinylidene fluoride, and mixtures thereof,
 wherein the heat-absorbing inorganic particle is at least one particle selected from the group consisting of antimony-containing compounds, metal hydroxides, guanidine-based compounds, boron-containing compounds and zinc tartrate compounds,
 wherein the antimony-containing compounds include antimony trioxide ($Sb_2O_3$), antimony tetraoxide ($Sb_2O_4$), antimony pentaoxide ($Sb_2O_5$) or a mixture thereof, the metal hydroxides include aluminum hydroxide ($Al(OH)_3$), magnesium hydroxide ($Mg(OH)_2$), or a mixture thereof, the guanidine-based compounds include guanidine nitrate, guanidine sulfaminate, guanidine phosphate, guanyl urea phosphate or a mixture thereof, the boron-containing compounds include $H_3BO_3$, $HBO_2$ or a mixture thereof, and the zinc tartrate compounds include $Zn_2SnO_4$, $ZnSnO_3$ (zinc stannate, ZS), $ZnSn(OH)_6$ (zinc hydroxyl stannate, ZHS), or mixtures thereof,
 wherein the separator is any one of the following separators:
 (a) the separator comprising the heat-absorbing inorganic particles and the binder polymer, wherein the heat-absorbing inorganic particles serve as both a support and a spacer for a porous structure, and wherein the heat-absorbing inorganic particles are interconnected among themselves and fixed by the binder polymer, and wherein interstitial volumes among the heat-absorbing inorganic particles form a pore structure; or
 (b) the separator comprising a porous substrate and an organic/inorganic composite porous coating layer totally or partially formed on a surface or in pores of the substrate by using a mixture of the heat-absorbing inorganic particles and the binder polymer, wherein the heat-absorbing inorganic particles are interconnected among themselves and fixed by the binder polymer, and the interstitial volumes among the heat-absorbing inorganic particles form a pore structure.

2. The separator as claimed in claim 1, wherein the heat-absorbing inorganic particles prevent the separator from shrinking or melting.

3. The separator as claimed in claim 1, wherein the porous substrate is formed of a polyolefin-based polymer or a polymer having a melting point of 200° C. or higher.

4. An electrochemical device comprising a cathode, an anode, the separator of claim 1 and an electrolyte.

5. The electrochemical device as claimed in claim 4, wherein the heat-absorbing inorganic particles contained in the separator inhibits the electrochemical device from undergoing rapid heat emission and ignition caused by an internal short circuit.

6. The electrochemical device as claimed in claim 4, which further comprises a microporous separator.

7. The electrochemical device as claimed in claim 4, which is a lithium secondary battery.

8. A separator comprising a mixture of a binder polymer having a glass transition temperature ($T_g$) of between −200° C. and 200° C., a solubility parameter of 15-45 $MPa^{1/2}$, and a dielectric constant of 10 or more as measured at a frequency of 1 kHz, and heat-absorbing inorganic particles which absorb heat energy generated at a temperature (T) higher than a normal drive temperature of an electrochemical device so that they are pyrolyzed, or consume the heat energy, wherein the binder polymer is selected from the group consisting of polyvinylidene fluoride-co-hexafluoropropylene, polyvinylidene fluoride-co-trichloroethylene, polymethylmethacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile-styrene-butadiene copolymer, polyimide, polyacarylonitrile-co-styrene, gelatine, polyethylene glycol, polyethylene glycol dimethyl ether, glyme, polyvinylidene fluoride, and mixtures thereof,
 wherein the heat-absorbing inorganic particle is at least one particle selected from the group consisting of antimony-containing compounds, metal hydroxides, guanidine-based compounds, boron-containing compounds and zinc tartrate compounds,
 wherein the antimony-containing compounds include antimony trioxide ($Sb_2O_3$), antimony tetraoxide ($Sb_2O_4$), antimony pentaoxide ($Sb_2O_5$) or a mixture thereof, the metal hydroxides include aluminum hydroxide ($Al(OH)_3$), magnesium hydroxide ($Mg(OH)_2$), or a mixture thereof, the guanidine-based compounds include guanidine nitrate, guanidine sulfaminate, guanidine phosphate, guanyl urea phosphate or a mixture thereof, the boron-containing compounds include $H_3BO_3$, $HBO_2$ or a mixture thereof, and the zinc tartrate compounds include $Zn_2SnO_4$, $ZnSnO_3$ (zinc stannate, ZS), $ZnSn(OH)_6$ (zinc hydroxyl stannate, ZHS), or mixtures thereof.

9. The separator as claimed in claim 8, wherein the heat-absorbing inorganic particles prevent the separator from shrinking or melting.

10. An electrochemical device comprising a cathode, an anode, the separator of claim 8 and an electrolyte.

11. The electrochemical device as claimed in claim 8, wherein the heat-absorbing inorganic particles contained in the separator inhibits the electrochemical device from undergoing rapid heat emission and ignition caused by an internal short circuit.

12. The electrochemical device as claimed in claim 8, which further comprises a microporous separator.

13. The electrochemical device as claimed in claim 8, which is a lithium secondary battery.

* * * * *